Patented Nov. 13, 1951

2,574,510

UNITED STATES PATENT OFFICE 2,574,510

CATIONIC SURFACE ACTIVE AGENTS AND METHOD OF PREPARATION

Jack T. Thurston, Riverside, Conn., and Wilbur N. Oldham, Monrovia, Calif., assignors to American Cyanamid Company, New York, N. Y., a corporation of Maine No Drawing. Application February 4, 1947, Serial No. 726,436

9 Claims. (Cl. 260—501)

This invention relates to surface-active or wetting agents and methods for the preparation thereof, and more particularly to the production of cationic surface-active compositions which are valuable softening agents for textiles.

This application is a continuation-in-part of our copending application Serial No. 542,246 filed June 26, 1944, now abandoned.

In our earlier application, above identified, we described and claimed an improved method for producing alkylol-substituted alkyl guanidine salts by reacting an alkylene oxide of 2–4 carbon atoms with an alkyl guanidine. The alkyl-substituted guanidine was preferably prepared by reacting the corresponding primary or secondary amine with an aqueous solution of cyanamide in the presence of an acidic material such as carbon dioxide, acetic acid, hydrochloric acid and the like, the reaction preferably being carried out in the presence of an organic solvent such as ethanol, propanol, dioxane, acetone and the like. Under these conditions a crude reaction mixture was obtained which could be condensed directly or after a preliminary concentration with ethylene oxide, propylene oxide or other alkylene oxides.

The present application is directed particularly to the class of products obtained by carrying out the above-described synthesis with the use of carbon dioxide as the acidic material. We have found that the results obtainable with carbon dioxide are entirely different from those obtained when acetic acid, hydrochloric acid or other acidic materials are used in the above-described product. This difference is due to the fact that carbon dioxide, when reacted with a primary or secondary aliphatic amine in water or an organic solvent, forms an amine salt of an N-aliphatic carbamic acid by the following reaction:

(1) $2R_1R_2NH + CO_2 \rightarrow R_1R_2N\text{—}COOH.R_1R_2NH$

These N-alkyl or dialkyl carbamic acid salts will then react with cyanamide to produce the corresponding mono- or di-substituted guanidinium salts by the reaction:

(2) $R_1R_2N\text{—}COOH.R_1R_2NH + H_2N\text{—}C\equiv N \rightarrow$
    $R_1R_2N\text{—}COOH.R_1R_2N\text{—}C(=NH)NH_2$ It will be understood that in the above Equations 1 and 2 the symbol $R_1$ represents an aliphatic radical, which may be either saturated or unsaturated, while the symbol $R_2$ means either hydrogen (in the case of a primary amine) or a second aliphatic radical which may be the same or different from $R_1$.

The fact that an alkyl guanidinium N-alkyl carbamate is formed, in accordance with the reactions outlined above, is demonstrated quantitatively by the following procedure: A solution of 134 grams (0.5 mol) of octadecylamine in 250 cc. of isopropanol is prepared in a flask equipped with a reflux condenser, thermometer and an inlet funnel by heating to 40° C. 12 grams of carbon dioxide gas are then introduced, after which the temperature is raised to approximately 80° C. and 140 cc. of a 22.5% aqueous solution of cyanamide (0.75 mol) is slowly added with continuous stirring during an interval of 2.5 hours. Additional carbon dioxide is passed into the solution continuously during the addition of the cyanamide solution and then for 15 minutes longer, in order to insure the presence of an excess of $CO_2$ at all times.

The resulting solution is filtered while hot and the filtrate is cooled, whereby 155 grams of product are obtained. This product is crystallized twice from hot ethanol, the second crystallization yielding a material having a melting point of 113°–116° C. which does not change with repeated crystallizations.

Upon analysis of the recrystallized product for carbon, hydrogen and nitrogen the following results are obtained:

| Calculated for— | Per Cent C | Per Cent H | Per Cent N |
|---|---|---|---|
| Octadecyl guanidine bicarbonate ($C_{20}H_{43}N_3O_3$) | 64.4 | 11.5 | 11.3 |
| Octadecyl guanidinium N-octadecyl carbamate ($C_{38}H_{80}N_4O_2$) | 73.1 | 12.8 | 8.9 |
| Found by analysis | 72.96 | 13.03 | 8.85 |
|  | 73.18 | 12.79 | 8.81 |

Another compound was prepared from octylamine in order to show that the same reaction takes place with amines of substantially lower molecular weight. A suspension of 129 grams (1 mol) of n-octylamine was prepared in 200 cc. of water at 50° C. and 22 grams of carbon dioxide were introduced. A 17.5% aqueous solution of cyanamide was then added in an amount of 360 grams (1.5 mols) over a 3-hour period at a temperature of 85°–90° C. with continuous stirring while continuing the introduction of carbon dioxide during the reaction and for one-half hour after all of the cyanamide had been added. On cooling the reaction mixture a solid separated which was filtered off and air-dried. The solid weighed 182 grams and melted at 104°–112° C. with decomposition.

A sample was dissolved in hot ethanol, treated with an absorptive carbon black, filtered and allowed to crystallize. This product was then recrystallized twice more from ethanol in order to obtain a sample having a constant melting point of 116°–120° C. which did not change upon further recrystallization. Upon analysis of the dried sample for carbon, hydrogen and nitrogen the following results were obtained:

| Calculated for— | Per Cent C | Per Cent H | Per Cent N |
|---|---|---|---|
| Octyl guanidine bicarbonate ($C_{10}H_{23}N_3O_3$) | 51.5 | 9.9 | 18.0 |
| Octyl guanidinium N-octyl carbamate ($C_{18}H_{40}N_4O_2$) | 62.79 | 11.72 | 16.28 |
| Found in sample prepared as described above | 62.74 | 11.79 | 16.53 |
| | 62.66 | 11.52 | 16.48 |

In carrying out reactions 1 and 2 under the conditions described in the specific examples of our above-entitled application, and particularly under the conditions described in Examples 1 and 2 thereof, wherein an excess of cyanamide is used, the yield of guanidinium carbamate of the formula shown in Equation 2 is on the order of 90–100%. For some purposes, however, and particularly for use in the preparation of a cationic softening composition for textiles by admixture with anionic surface-active agents containing a single long aliphatic radical of at least 12 carbon atoms, as described in the copending application of E. A. Vitalis et al., Serial No. 593,758, filed May 14, 1945, now Patent No. 2,427,242, a product containing only about 50–70% of the amine in the form of a guanidinium carbamate is desired. Such a product can easily be obtained by reducing the quantity of cyanamide added to the reaction.

Experience has shown that the products obtained by reacting the aliphatic guanidinium N-aliphatic carbamates with an alkylene oxide such as ethylene oxide, propylene oxide or butylene oxide are better cationic wetting agents and softeners for textiles than those obtained by reacting the same alkylene oxides with guanidinium salts of any other acid, including the acetic acid, hydrochloric acid and other acids described in our above-entitled application. Accordingly, the compositions of the present invention are those in which a composition containing an aliphatic guanidinium N-aliphatic carbamate of the formula $R_1R_2N-COOH.R_1R_2NC(=NH)NH_2$ in which $R_1$ is an aliphatic radical, preferably of 8 to 18 or more carbon atoms and $R_2$ is hydrogen or a similar aliphatic radical is reacted with an alkylene oxide containing a single epoxy group, i. e., the reaction products of ethylene oxide ($CH_2CH_2O$), propylene oxide ($CH_3.CH.CH_2O$) or butylene oxide ($CH_3.CH_2.CH.CH_2O$) or similar compounds such as glycidol. When compositions of good wetting and textile softening properties are desired, all the aliphatic radicals of these compounds preferably contain at least 8 carbon atoms, and even better results are obtained when they contain about 12–18 carbon atoms.

The formation of mono- and di-aliphatic guanidine derivatives from the corresponding mono- and di-aliphatic amines by reacting the carbon dioxide derivative thereof with cyanamide is described in our copending application Serial No. 726,438, filed February 4, 1947. Any mono- or di-alkyl amine may be used for this purpose including amines of low molecular weight such as ethylamine, propylamine, isopropylamine, n-butylamine, isobutylamine, amylamine, diethylamine, dipropylamine, di-isopropylamine, di-n-butylamine, and diamylamines. However, as has been stated, amines in which one or both of the aliphatic radicals contain at least 8 carbon atoms are preferred for use in the preparation of compositions of good wetting and textile-softening properties, and therefore the preferred amines are those of 8–18 or more carbon atoms. Typical compounds of this class are mono-n-octylamine, mono - 2 - ethylhexylamine, mono - n - decylamine, mono - n - dodecylamine, mono - n - tetradecylamine, mono-n-hexadecylamine, mono-n-octadecylamine and mixtures thereof, all of which are readily obtainable from the corresponding monocarboxylic acids. The corresponding di-alkyl amines such as di-n-octylamine ($C_8H_{17}$)$_2NH$, di-decylamine, di-dodecylamine, di-tetradecylamine, di-hexadecylamine, and di-octadecylamine may also be used. For many purposes a mixture of saturated and unsaturated mono-alkyl amines of 16–18 carbon atoms is particularly suitable because it is available commercially in large quantities. Thus, for example, a mixture containing about 25–30% of hexadecylamine, about 25% of saturated octadecylamine, and about 45–50% of unsaturated primary amines of 18 carbon atoms is available commercially at a relatively low price.

Any of the above or other primary or secondary amines may be reacted with carbon dioxide in water or an organic solvent such as ethanol, propanol, butanol, dioxane, or acetone to form the corresponding N-mono- or di-aliphatic carbamic acid amine salt, which can be converted into the corresponding mono- or di-aliphatic-substituted guanidinium N-mono- or di-aliphatic carbamate by reaction with cyanamide. Upon condensing these guanidinium compounds with lower alkylene oxides of 2–4 carbon atoms the condensation products of the present invention are obtained.

The amount of alkylene oxide condensed in our product depends upon the desired property or properties and the degree and combination of these properties in the use to which the products are put. Generally it is preferable to condense from 1–25 mols of alkylene oxide for each mol of amine used although as much as 1–50 mols or more may be condensed when desired. When water solubility and wetting power of the alkylene oxide condensation product are the desired properties, the amount of alkylene oxide condensed depends largely upon the type of the amine and the particular alkylene oxide used as well as the ratio of the alkylene oxide to the amine. It should be understood that the condensation with alkylene oxide introduces water-solubilizing or hydrophilic groups into the final condensation product whereas the radical or radicals in the aliphatic amine is or are hydrophobic or oil-solubilizing groups. The formation of compounds capable of orientating themselves at an oil-water interface to produce surface activity and wetting and detergent properties takes place by combining enough alkylene oxide with the chosen aliphatic amine to produce a balance between the hydrophilic and hydrophobic groups. Under these circumstances preferably 1–12 mols and when desirable as much as 1–50 or more mols of alkylene oxide can be condensed for each mol of amine used. Thus, for example, when octadecyl amine is used we have found that optimum wetting and emulsifying properties are obtained by condensing about 6–12 mols of ethylene oxide for each mol of this amine. With dodecyl amine, on the other hand, a molar ratio of about 3–6 mols of ethylene oxide for each mol of the amine produces a condensation product having good wetting properties. With alkyl amines of lower molecular weight, such as mono-octyl amine, 1–2 mols of ethylene oxide are in many cases sufficient to impart the requisite degree of water-solubility to the composition. Larger quantities of alkylene oxide can of course be used as stated above.

The condensation products obtained by the process of our invention vary in form from waxes to viscous liquids depending on the type of amine employed and the type and molecular amount of alkylene oxide condensed therewith. As stated above, the degree of water-solubility depends largely on the amount and type of alkylene oxide used in the condensation.

Essentially our process comprises reacting carbon dioxide with a substituted amine having at least one hydrogen atom attached to the amine nitrogen atom, preferably a primary or secondary aliphatic amine in which each aliphatic radical contains 8–18 or more carbon atoms, reacting cyanamide with the product therefrom and then introducing an alkylene oxide containing 2–4 carbon atoms until a water-soluble product is obtained. The amount of alkylene oxide to be used depends on the degree of water solubility and other properties that may be desired, as is explained above.

The reaction of the carbon dioxide with the amine is carried out by forming a solution of the amine and then bubbling preferably an excess of carbon dioxide through the solution for a sufficient length of time to complete the reaction. The cyanamide is then introduced into the solution over a period of time during which the carbon dioxide addition may be continued, and then the alkylene oxide is introduced after all the cyanamide has been added. According to our process the final condensation product is obtained by a single continuous process that starts with the solution of the amine and is especially well suited for large-scale manufacture.

As is stated above, N-aliphatic carbamic acid salt compositions can be obtained by the process of our invention for reaction with ethylene oxide which contain about 50–70 mol per cent of the amine in the form of aliphatic guanidinium N-aliphatic carbamate and about 50–30 mol per cent in the form of the aliphatic amine salt of an N-aliphatic carbamic acid. This corresponds to a reaction product of cyanamide with the aliphatic amine salt of N-aliphatic carbamic acid which contains about 15–25 mol per cent of the amine in an unconverted condition; i. e., present as a salt of the carbamic acid, about 50 mol per cent of N-aliphatic-substituted carbamic acid, and about 25–35 mol per cent of aliphatic-substituted guanidine, based on the total quantity of amine used. Such a composition may be obtained by adding to the reaction mixture an amount of cyanamide less than that theoretically necessary to react with all of the aliphatic amine salt of the N-aliphatic carbamic acid according to reaction 1 such as, for example, by using .3 to 0.5–0.6 mol of cyanamide for each mol of the carbamic acid salt. Both the aliphatic guanidinium N-aliphatic carbamate and the aliphatic amine salt of N-aliphatic carbamic acid are reactive with alkylene oxides of the type described above, and both types of compound are converted into a water-soluble condition by reaction therewith.

In carrying out complex organic reactions with reagents such as used in the process of this application it is to be expected by one skilled in the art that considerable quantities of by-products are formed and that reproducible results would be difficult to obtain. We have found, and it is one of the principal advantages of our invention, that our process gives reproducible results and it is relatively easy to obtain uniform quality from batch to batch in large-scale production.

Another important advantage of our process is its flexibility in that any desired quantity of alkylene oxide may be condensed with the product after the cyanamide reaction. Where desirable as much as from 8–12 mols of the oxide can be condensed for each mol of amine used. This is a very useful advantage in the preparation of wetting agents for it is a simple matter to obtain any desired balance between the quantity of hydrophilic and hydrophobic groups present in the final products.

Still another and perhaps the most important advantage of our invention is that by reacting carbon dioxide with an amine, reacting cyanamide with the reaction products therefrom and then condensing an alkylene oxide therewith, a new and improved class of compositions are produced which are useful as cationic surface active agents.

The invention will be illustrated in greater detail by the following specific examples. It should be understood, however, that while these examples may describe some of the more specific features of the invention, they are given primarily for purposes of illustration and the invention in its broader aspects is not limited thereto.

*Example 1*

A surface active agent in which about 1.5 moles of cyanamide and about 6 moles of ethylene oxide were used for each mole of octadecylamine was prepared as follows:

| | Lbs. |
|---|---|
| Octadecylamine (Neut. Equiv. 277) | 41.5 |
| 2–B alcohol | 27.9 |
| Water | 2.64 |
| Carbon dioxide in excess (theory) | 6.5 |
| 24.4% aqueous cyanamide solution | 38.8 |

The octadecylamine was added to the alcohol and water contained in a 20-gallon, glass-lined kettle and heated to approximately 60–65° C. in order to obtain a complete solution. Carbon dioxide was then passed into this solution for approximately one hour. The temperature was then raised to approximately 80° C. and the cyanamide solution added to the well-stirred mixture during an interval of 4–4.5 hours. Carbon dioxide was also passed into the solution continuously during the addition of the cyanamide solution and then for another hour, during which time the temperature was maintained at 80° C.

A product in the amount of 112 lbs. was obtained which was calculated as having 47% solids. 100 lbs. of acetone was added to this product which was then placed in an autoclave provided with internal coils for temperature regulation. The autoclave temperature was raised to and held at 85° C. and ethylene oxide was passed in at such a rate that the pressure was at all times less than 75 lbs. per square inch. A total of 37.5 lbs. of ethylene oxide was combined with the product in this manner.

The product was discharged from the autoclave while still hot and concentrated to a solids content of approximately 87.5% by distillation. When the distillation temperature reached 100° C., a 10 inch vacuum was applied and the heating continued until the boiling temperature at the reduced pressure was 95° C. The yield was 100.5 lbs. of a product containing 85.7% solids.

Example 2

A second batch of product was prepared in which isopropyl alcohol was used as solvent and about 8 moles of ethylene oxide was used for each mole of octadecylamine. The materials employed were as follows:

| | Lbs. |
|---|---|
| Octadecylamine | 83 |
| Isopropyl alcohol | 41.5 |
| Carbon dioxide (theory, 6.5 lbs.) | 27.5 |
| Water | 5.28 |
| Cyanamide (23.9% aqueous solution) | 79.5 |
| Ethylene oxide | 110 |

The amine was dissolved in the isopropyl alcohol by heating to 45° C., and then the solution was pumped into a 50-gallon enameled kettle along with the water. During 1.5 hours 19 lbs. of Dry Ice was added in small portions, the temperature being kept below 65° C. by cooling. The reaction was not apparently exothermic after one half of the Dry Ice had been added.

The cyanamide solution was next added slowly over a period of 4.75 hours under a reflux condenser, the reaction temperature being kept at 83–89° C. by heating. Simultaneously, a total of 8.5 pounds of carbon dioxide was bubbled through the reaction mixture to make certain that an excess was present at all times. After the cyanamide addition was complete the mixture was heated an additional hour.

The kettle was adapted for pressure and an ethylene oxide tank attached so that ethylene oxide could be introduced into the kettle above the surface of the reaction mixture. The ethylene oxide was slowly added at 60–66° C., and the reaction was found to be moderately exothermic so that almost continuous cooling was necessary. The ethylene oxide was added at such a rate that at 60–66° C. the internal pressure in the kettle did not exceed 20 lbs. per square inch.

A total of 110 lbs. of ethylene oxide was added during 4 hours. During the first ½ hour period it was possible to add 19 lbs. of ethylene oxide, but toward the end of the addition period only 10–12 lbs. could be added during ½ hour and still maintain the pressure below 20 lbs. per square inch. It was noted that when the ethylene oxide addition was stopped, the pressure dropped abruptly, indicating almost instantaneous reaction. After the addition was complete the product was heated to 90° C. for a few minutes, then cooled to 70° C. and allowed to stand overnight.

The product was then concentrated by distilling until the internal temperature reached 102° C., 25 lbs. of distillate being recovered. The mixture was then cooled to 65° C. and a 10–16 inch vacuum applied while the kettle was again heated and distillation continued. 280 lbs. of a product having a solids content of about 80–82% was finally obtained in the form of a dark yellow syrup. The product gave excellent results when applied as a cationic textile softener.

Example 3

The procedure described in Example 1 was carried out using various amines as starting material. The indicated amount of the aliphatic guanidinium N-aliphatic carbamate composition obtained after the cyanamide addition was reacted with the quantities of ethylene oxide listed in each case to obtain the product described in the following table. In all cases the ethylene oxide condensation was carried out at 125° C. during 1 hour.

| Substituted guanidinium carbamate grams | Amine Used | Moles Amine | Acetone, cc. | Ethylene Oxide g. | Ethylene Oxide mol | Approx. Ratio Amine to Ethylene Oxide | Characteristics of Product |
|---|---|---|---|---|---|---|---|
| 72 | Diethyl Amine | 0.413 | 300 | 18 | 0.41 | 1:1 | Water soluble; very basic. |
| 76 | Butylamine | 0.436 | 325 | 28 | 0.637 | 1:1.5 | Do. |
| 129 | Dodecylamine | 0.447 | 550 | 19 | 0.433 | 1:1 | Soluble in dilute acetic acid; foams well. |
| 129 | ...do | 0.447 | 550 | 79 | 1.8 | 1:4 | Water soluble; basic. |

Example 4

Cationic surface-active compositions were prepared with octadecylamine using the procedure described in Example 1. The material and the quantities are tabulated below:

| Octadecyl, g. | amine, moles | Isopropanol, g. | Water, g. | Cyanamide g. | Cyanamide moles | Molar Ratio | Cyanamide: Per Cent [1] Amine Conversion |
|---|---|---|---|---|---|---|---|
| 200 | 0.72 | 100 | 10 | 76 | 0.36 | .5 | 72.0 |
| 400 | 1.44 | 200 | 20 | 88.5 | 0.432 | .3 | 49.0 |
| 520 | 2.0 | 260 | 10 | 220 | 0.82 | .41 | 68.4 |
| 520 | 2.0 | 255 | 10 | 193 | 0.72 | .37 | 67.6 |

[1] To octadecyl guanidinium N-octadecyl carbamate in reaction product.

Upon reaction with 5–7 mols of ethylene oxide for each mol of octadecylamine used as starting materials water-soluble products were obtained which were particularly well suited for use in the preparation of cationic softeners for textiles.

Example 5

Using the procedure outlined in Example 1, 1 mol of octadecylamine was reacted with an excess of carbon dioxide and 1.5 mols of cyanamide was reacted with the product therefrom. Varying ratios of ethylene oxide to the amine were reacted with 100 grams of the product after the cyanamide reaction. The ethylene oxide was added in an autoclave during 1.5 hours at 125° C. The quantities used in preparing these surface active agents are tabulated in the following table:

| Run Number | Ethylene Oxide g. | Molar Ratio | Solvent | Isolation Procedure |
|---|---|---|---|---|
| 1 | 22 | 2 | Dioxane 1000 cc | Evaporated to wt. of 250 gr. |
| 2 | 17 | 1.5 | Dioxane 300 cc | Evaporated to thick syrup. |
| 3 | 17 | 1.5 | Acetone 500 cc | Carbonated M. P., 60–65° C. |
| 4 | 11 | 1 | Acetone 500 cc | Evaporated to thick syrup. |

*Example 6*

To 50 g. of product after the cyanamide addition according to the procedure of Example 1 was added 47.5 g. (0.84 mol) propylene oxide (amine to ethylene oxide ratio 6 to 1) and the mixture was heated in a pressure bottle for 15 hours at 65° C. Evaporation of the solvent under reduced pressure left 100 g. of a thick liquid that slowly deposited solid on standing.

*Example 7*

A sample was prepared as follows:

| | Mol. Wt. | Amt. | Mols |
|---|---|---|---|
| Octylamine | 129 | 129 g | 1 |
| Carbon dioxide | 44 | in excess | |
| Cyanamide (25% aqueous solution) | 42 | 251 cc | 1.5 |
| Isopropanol | | 450 cc | |

The amine and alcohol were placed in a 1 liter three-necked flask equipped with a reflux condenser, thermometer and an inlet funnel. 25 grams of carbon dioxide were bubbled through the solution which was at room temperature. The temperature was then raised to approximately 80° C. and the cyanamide solution was added to the well stirred mixture during an interval of 2.5 hours. Carbon dioxide was also passed into the solution continuously during the addition of the cyanamide solution and then for another 15 minutes.

660 grams of ethylene oxide (15 mols of oxide for each mol of amine used) were passed into the flask over a period of 20 hours during which time the temperature of the reaction mixture was between 65°–75° C. This mixture was then divided into two equal parts. One of these was concentrated to a solids content of about 87% to yield 504 grams of a product which had the appearance of a yellow syrup.

Additional ethylene oxide was added to the remaining half of the divided sample during which addition the temperature of the reaction mixture was also between 65–75° C. The ethylene oxide addition was continued until 330 grams (7.5 mols) were added and this quantity together with that of the first addition amounted to a total of 30 mols of oxide condensed for each mol of amine used. The mixture after this second ethylene oxide addition was concentrated to a solids content of about 87% to yield 880 grams of a yellow syrup-like product. Both products were water soluble and showed good cationic surface activity.

*Example 8*

A sample was prepared as follows:

| | Mol. Wt. | Amt. | Mols. |
|---|---|---|---|
| Octadecylamine | 267 | 134 | 0.5 |
| Carbon dioxide | 44 | in excess | |
| Cyanamide (22.5% aqueous solution) | 42 | 140 cc | 0.75 |
| Isopropyl alcohol | | 250 cc | |

The amine and alcohol were placed in a 1 liter three-necked flask equipped with a reflux condenser and an inlet funnel. Upon heating to a temperature of 40° C. the amine dissolved. The temperature was then raised to approximately 80° C. and the cyanamide solution was added to the well stirred mixture during an interval of 2.5 hours. Carbon dioxide was also passed into the solution continuously during the addition of the cyanamide solution and then for 15 minutes more.

550 grams (12.5 mols) of ethylene oxide which amounted to 25 mols of oxide for each mol of amine used were then passed into the flask over a period of 20 hours and during this addition the temperature of the reaction mixture was between 65°–75° C. The mixture was divided into two equal parts. One of these was concentrated to a solids content of about 72% to yield 505 grams of product.

The addition of ethylene oxide was continued with the remaining half of the divided sample until an additional 275 grams (6.75 mols) were added. Thus the total ethylene oxide addition for this half of the sample amounted to 50 mols of the oxide for each mol of amine used. During the second ethylene oxide addition, the temperature of the reaction mixture was also between 65°–75° C. After adding the additional amount of the oxide, the reaction mixture was concentrated to a solids content of about 82% to yield 778 grams of product. Both products were water soluble and showed good cationic surface activity.

A considerably cheaper product of approximately the same molecular composition and having equally good cationic surface activity is obtained by substituting commercial mixtures of higher aliphatic amines for the octadecylamine used in the above examples. Thus, for example, a mixture containing about 25% of hexadecyl amine, 25% of octadecyl amine, and 50% of octadecenylamine is available commercially in large quantities, and is a preferred raw material in practicing the present invention.

What we claim is:

1. An alkylol-substituted aliphatic guanidinium N-alkylol aliphatic carbamate, said carbamate being prepared by reacting an aliphatic amine having at least one hydrogen atom attached to the amine nitrogen atom with sufficient carbon dioxide to form a salt therewith, reacting the amine salt so obtained with cyanamide to convert a portion of the amine salt to the corresponding aliphatic guanidine salt, and condensing the resulting product with an alkylene oxide of 2–4 carbon atoms.

2. A surface active agent prepared by reacting carbon dioxide with an alkylamine of 8–18 carbon atoms and having at least one hydrogen atom attached to an amine nitrogen atom, reacting cyanamide with the product therefrom and then introducing an alkylene oxide having 2–4 carbon atoms until 1–12 mols of the oxide have condensed for each mol of amine used.

3. A surface active agent prepared by reacting a primary aliphatic amine having 8-18 carbon atoms with carbon dioxide, reacting cyanamide with the products therefrom and then introducing an alkylene oxide having 2-4 carbon atoms until 1-12 mols of the oxide have condensed for each mol of amine used.

4. A surface active agent prepared by reacting carbon dioxide with octadecyl amine, then reacting cyanamide with the products therefrom and thereafter introducing ethylene oxide until 1-12 mols of said oxide have condensed for each mol of said amine used.

5. A cationic surface-active composition containing as a principal constituent an alkylol-substituted aliphatic guanidinium N-alkylol-substituted aliphatic carbamate prepared by reacting carbon dioxide with an aliphatic amine of 8-18 carbon atoms and having at least 1 hydrogen atom attached to the amine nitrogen atom, reacting cyanamide with the products therefrom, and then condensing therewith an alkylene oxide having 2-4 carbon atoms.

6. A cationic surface-active composition containing as a principal constituent an alkyl alkylol guanidinium N-alkyl alkylol carbamate prepared by reacting carbon dioxide with an alkylamine of 8-18 carbon atoms and having at least one hydrogen atom attached to the amine nitrogen atom, reacting cyanamide with the products therefrom, and then introducing an alkylene oxide having 2-4 carbon atoms until 1-12 mols of the oxide have condensed for each mol of the amine used.

7. In the manufacture of a cationic surface-active agent, the method of producing a mixture of aliphatic guanidinium N-aliphatic carbamate and aliphatic amine salt of N-aliphatic carbamic acid which comprises reacting an aliphatic amine salt of N-aliphatic carbamic acid of the formula $$R.NH_2.HOOC.NH.R$$

in which R is an aliphatic radical of 8-18 carbon atoms with a quantity of cyanamide less than that necessary to convert all of the aliphatic amine salt to the corresponding guanidinium salt.

8. A method according to claim 7 in which the quantity of cyanamide is within the range of 0.3 mol to 0.6 mol for each mol of the N-aliphatic carbamic acid salt.

9. A method of producing a cationic surface-active agent which comprises carrying out the method defined by claim 8 and condensing the product with ethylene oxide in the ratio of about 1-12 mols of ethylene oxide for each mol of aliphatic amine.

JACK T. THURSTON.
WILBUR N. OLDHAM.

REFERENCES CITED

The following references are of record in the file of this patent:

UNITED STATES PATENTS

| Number | Name | Date |
|---|---|---|
| 2,136,928 | Schlack | Nov. 15, 1938 |
| 2,194,082 | Booth | Mar. 19, 1940 |
| 2,213,474 | Puetzer | Sept. 3, 1940 |
| 2,221,478 | Hill et al. | Nov. 12, 1940 |
| 2,349,061 | Uncles et al. | May 16, 1944 |
| 2,350,453 | Ericks | June 6, 1944 |
| 2,427,242 | Vitalis et al. | Sept. 9, 1947 |

OTHER REFERENCES

Flascheutrager et al., Chem. Abstracts, vol. 25, p. 497 (1931).

Certificate of Correction

Patent No. 2,574,510 — November 13, 1951

JACK T. THURSTON ET AL.

It is hereby certified that error appears in the printed specification of the above numbered patent requiring correction as follows:

Column 8, Example 4, in the table, headings to columns 7 and 8 thereof, for

| Molar Ratio | Cyanamide: Per Cent Amine Conversion |
|---|---| read

| Molar Ratio Cyanamide: Amine | Per Cent Conversion¹ |
|---|---| and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*